Dec. 21, 1937.   E. WILDHABER   2,102,659
METHOD OF PRODUCING GEARS
Original Filed June 23, 1933   3 Sheets—Sheet 3

Inventor
Ernest Wildhaber
By
B. V. Schlesinger
Attorney

Patented Dec. 21, 1937

2,102,659

UNITED STATES PATENT OFFICE 2,102,659

METHOD OF PRODUCING GEARS

Ernest Wildhaber, Rochester, N. Y., assignor to Gleason Works, Rochester, N. Y., a corporation of New York Application June 23, 1933, Serial No. 677,243
Renewed March 1, 1937

26 Claims. (Cl. 90—4)

The present invention relates to gears and particularly to longitudinally curved tooth bevel and hypoid gears. It involves novel forms of tapered gears and novel methods of producing the same. In the latter respect, it embraces novel methods of cutting, burnishing, lapping and shaving spiral bevel and hypoid gears.

One object of the invention is to provide a form of tapered gearing which can be produced with great accuracy and at comparatively low cost and which, in use, will be insensitive to errors in mounting and to variations in load.

A further object of the invention is to provide a method of hobbing tapered gears which will produce an improved tooth surface finish.

Still another object of the invention is to provide a method for finishing gears as by lapping, burnishing, shaving, etc. in which the pitch errors of the gear being finished are rapidly corrected and in which truing motions may readily be provided for automatically maintaining the lap or burnishing tool in correct shape without a separate truing operation.

Still another object of the invention is to provide methods for cutting and finishing longitudinally curved-tooth tapered gears with worm hobs or worm-shaped tools in which the same tools may be used for a range of different jobs.

In a pair of gears constructed according to the present invention, one member of the pair, preferably the larger member, has tooth surfaces which are parts of involute helicoidal surfaces concentric with the axis of the gear and the other member of the pair has tooth surfaces which are formed to match those of its mate gear. It has been found that gears of this type can be made insensitive to variations in mountings and loads when in use, and so that the tooth bearing will remain midway the height of the teeth at all times, thus making for proper distribution of loads and preventing undue wear.

The present invention is based upon the discovery that a tapered member having involute helical thread surfaces can be made to mesh simultaneously and correctly with both sides of the teeth of a tapered gear having tooth surfaces which are parts of involute helicoidal surfaces. This tapered member may be embodied as a hob, or also as a burnishing, a shaving, or a lapping tool. As a burnishing or lapping tool, it takes the form of a taper worm having involute helicoidal thread surfaces. For shaving, the thread surfaces of this worm are suitably notched or gashed to provide cutting edges and for hobbing, the thread surfaces of this worm are gashed and relieved.

To hob a pair of gears according to the present invention, one member of the pair, preferably the larger, is cut by simply feeding a hob into depth while rotating the hob and blank continuously together, and the other member is cut preferably by rotating a hob and blank together and simultaneously producing a relative generating movement between the hob and blank as though the gear being cut were rolling with its mate gear. An especially fine finish can be obtained on the first member if in the cutting of the same, the hob is additionally fed with relation to the blank in a direction approximately parallel to the pitch surface of the hob at the zone of its engagement with the blank. Hobs of identical hand and, in fact, identical hobs may be used in cutting the two members of the pair.

The shaving of gears according to the present invention is similar to the hobbing operation, except that a geared connection between the shaving tool and work is not necessary, as the tool may drive the work by its intermeshing engagement therewith.

For lapping or burnishing, the tapered worm-tool is preferably used only in the finishing of the non-generated member of the pair. A suitable lapping compound or burnishing lubricant is constantly supplied and the gear is driven from the tool simply by their intermeshing engagement. The motion between the tool and gear in the direction of the pitch surface of the tool at the zone of engagement of the tool and gear is preferably employed because it provides a correcting motion which maintains the lap or burnishing tool true. Another motion may also be provided in the direction of the gear axis. These two motions will provide complete self-correction for the gear and the lap.

The generated member of the pair is preferably lapped or burnished by running it with its mate, though a cast-iron lap-gear corresponding to the mate may be employed instead in the lapping process. In the latter case, the lap is preferably reciprocated in the direction of its axis to provide a truing motion and prevent it from wearing out of shape.

Following the usual practice in spiral bevel and hypoid gearing, a pair of gears constructed according to the present invention are preferably made so that their mating tooth surfaces have a slight mismatch. This permits the gears to readily accommodate themselves to the variations in loads and mountings that occur in use. This mismatch does not have to be built into the hob as has heretofore been required, but can be obtained by using standard hobs. One way in which suitable mismatch can be produced is by cutting the pinion conjugate to a gear which has a slightly different pitch cone angle from the pitch cone angle of its mate.

The principal objects of the present invention have been described above. Other objects of the invention will be apparent hereinafter from the disclosure and from the recital of the appended claims.

Figures 1, 2, 3, 6, 7:
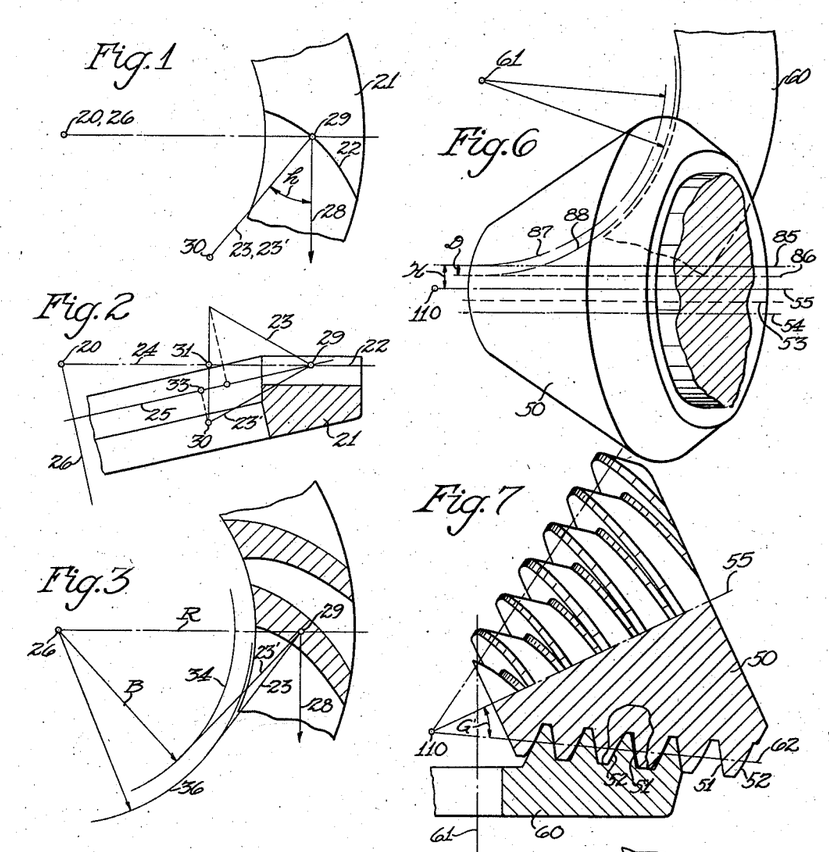
Figure 1 is a diagrammatic view showing a fragment of the developed pitch surface of a gear constructed according to the present invention.
Figure 2 is a fragmentary axial section through this gear, showing also diagrammatically the direction of the mean normals to the tooth surfaces of said gear.
Figure 3 is another fragmentary diagrammatic view of said gear, and showing a section through the teeth of the gear in a plane perpendicular to the gear axis.
Figures 6 and 7 are diagrammatic views illustrating the preferred method of hobbing the gear or larger member of the pair according to the present invention, Figure 7 showing in addition the structure of the tapered tool employed in the present invention.

In Figures 1 and 2, 20 designates the apex of a tapered gear 21 cut according to the present invention and having longitudinally curved teeth. This gear has teeth of substantially uniform depth throughout its length as clearly shown in Figure 2. 22 denotes the pitch line of one of the tooth surfaces. One side of the teeth of the gear is longitudinally convex and the other side longitudinally concave. The normals 23 and 23' to the opposite side tooth surfaces will be respectively inclined in opposite directions to the pitch surface 24 of the gear, as clearly shown in Figure 2.

In the case of bevel gears, the involute helicoids are so determined as to have equal pressure angles on both tooth sides at the middle of the face. This follows the usual practice for bevel gears of other tooth formation. In this case, the normals 23 and 23' will be inclined at equal angles to the plane 24, as shown. The normals will be inclined at different angles, however, to the plane 25 perpendicular to the axis 26 of the gear.

The positions of the tooth normals relative to the plane 25 may be readily determined by the methods of descriptive geometry. These positions are illustrated in Figure 3 which is a section taken in the plane 25. For convenience, the formulas for accurate computation of said positions will be given.

Let $a$ denote the inclination of a normal with respect to the pitch plane 24, that is, the normal pressure angle of the gear teeth. For the convex side of the gear teeth, the value $a$ will be considered positive and for the concave side of the gear teeth, the value will be considered negative. $a_1$ denotes the inclination of the tooth normal with respect to the plane 25. $h$ designates the spiral angle of the gear teeth, namely the inclination of the projected normal to the peripheral direction 28, see Figure 1. $h_1$ denotes the inclination of the normal 23 or 23' projected into the plane of Figure 3, with reference to the peripheral direction 28, as shown in Figure 3.

29 designates a mean point of contact between the gear 21 and its mate. If a unit distance is plotted on a tooth normal from the mean point 29 to the point 30 so that the actual distance 29—30 in space equals unity, then the distance 30—31 of point 30 from plane 24 is equal to $\sin a$ and the distance 29—31 is $(\cos a \cdot \sin h)$, see Figure 2.

$\sin a_1 =$ distance 30—33 of point 30 from plane 25
$= (30-31) \sin G - (29-31) \cos G$
$\sin a_1 = \sin a \cdot \sin G - \cos a \cdot \sin h \cdot \cos G$ (I)

where G is the pitch cone angle of the gear.

The projection of the unit distance plotted along the tooth normal to the peripheral direction 28 can be put down as $\cos a \cdot \cos h$ and also as $\cos a_1 \cos h_1$ hence,
$$\cos a_1 \cos h_1 = \cos a \cdot \cos h$$
or
$$\cos h_1 = \frac{\cos a}{\cos a_1} \cdot \cos h \quad \text{(II)}$$

In accordance with the present invention, the tooth surfaces of one member of the pair, preferably the larger member, are made parts of involute helicoidal surfaces concentric with the gear axis. As is well known, all normals of an involute helicoid have a constant inclination with respect to its axis or also with respect to a plane perpendicular to its axis and they have a constant distance from said axis. In other words, they envelop a base circle or a base cylinder.

All the normals to the convex tooth side are inclined like the normal 23' to any plane perpendicular to the gear axis 26, the angle of their inclination being the same as the angle of the inclination of the normal 23', namely angle $a_1$. These normals envelop a base-cylinder 34 (Figure 3) whose radius B is equal to the distance of the axis 26 from normal 23'.

$$B = (26-29) \cdot \cos h_1,$$

where $h_1$ is the inclination of the projected normal 23' to the peripheral direction 28.

Likewise, all the tooth normals of the concave side of the gear tooth are inclined like normal 23 to any plane perpendicular to the gear axis and envelop a base-cylinder 36.

If we let R denote the distance (26—29) of point 29 from axis 26 and N denote the number of gear teeth, the pitch $P_1$ along the tooth normals may be written as $$P_1 = \frac{2\pi R}{N} \cdot \cos a \cdot \cos h = \frac{2\pi R}{N} \cos a_1 \cos h_1, \quad (III)$$

or $$\frac{P_1}{2\pi} = \frac{R}{N} \cos a_1 \cos h_1$$

This pitch $P_1$ along the tooth normals will be referred to as the base-pitch hereafter.

Figure 4:
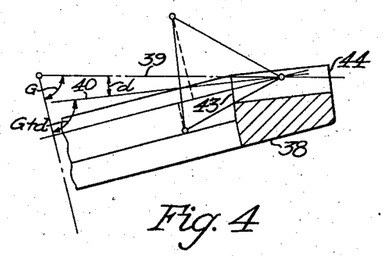
Figure 4 is a fragmentary axial section through a gear constructed according to a modification of my invention.
Figure 5:
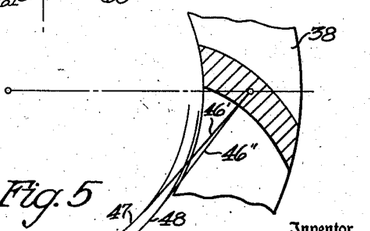
Figure 5 is a view similar to Figure 3 and further illustrative of the modification shown in Figure 4.

In Figures 4 and 5, a slightly modified construction of gear 38 is illustrated. Here, the longitudinal elements of the gear teeth do not extend parallel to the pitch surface 39, but are inclined at an angle $d$ thereto. The longitudinal element of the gear teeth in this case has the direction of the line 40, which includes an angle $(G+d)$ with the gear axis 42, which is larger than the pitch angle G of the gear. As a result, the dedendum at the inner end 43 of the gear teeth is greater and the dedendum at the outer end 44 of the gear teeth is less than in standard designs. The mating pinion of such a gear will then have a longer addendum and a shorter dedendum at the inner end of its teeth than standard. Such proportions are desirable to avoid undercut.

The pressure angle $a'$, with respect to a plane containing line 40 may be determined by the known methods of descriptive geometry. Formulas are given here, however, to permit their calculation. Spiral angle $h'$ may be made equal to spiral angle $h$. For bevel gears, the normal pressure angles $a'$ are preferably made unequal on the two sides of the teeth so that the actual transverse pressure angle $$a_2\left(\tan a_2 = \frac{\tan a}{\cos h}\right)$$

is the same on both sides of the teeth. This construction will provide equally curved tooth profiles on the two sides of the teeth. On hypoid gears, the pressure angles $a'$ are so selected as to furnish the desired unequal pressure angles $a_2$ on the two sides.

From the showing of Figure 4:

$$\tan a_2' = \frac{\tan a'}{\cos h'} = \frac{\tan a_2}{\cos d} - \tan d \cdot \tan h'$$

or since $h' = h$ $$\frac{\tan a'}{\cos h'} = \frac{\tan a}{\cos h \cdot \cos d} - \tan d \cdot \frac{\sin h'}{\cos h'}$$

and $$\tan a' = \frac{\tan a}{\cos d} - \tan d \cdot \sin h' \quad (IV)$$

The angle $a$ is introduced in the above formulas as positive on the convex tooth side and as negative on the concave tooth side.

Angles $a_1$ and $h_1$ may then be determined from formulas I and II by using $a'$ and $h'$ in place of $a$ and $h$ and by using $(G+d)$ instead of G. Formulas I and II are then transformed into:

$$\sin a_1 = \frac{\sin a' \sin (G+d) - \cos a' \sin h'}{\cos (G+d)} \quad (Ia)$$

and $$\cos h_1 = \frac{\cos a' \cos h'}{\cos a_1} \quad (IIa)$$

The base pitch $P_1$ may again be determined with Formula III:

$$P_1 = \frac{2\pi R}{N} \cdot \cos a_1 \cos h_1$$

The normals 46' and 46" to the two sides of the teeth 38 of the gear envelop, as before, different base cylinders 47 and 48, respectively. The radius B of the base cylinder 47 may be determined as before $$B = R \cos h_1 \quad (V)$$

It is found that in the arrangement referred to in Figures 4 and 5, the radii of the base cylinders 47 and 48 differ less than the radii of the base cylinders 34 and 36 of Figure 3.

Now I have discovered that a tapered member having involute helical thread surfaces can be made to mesh simultaneously and correctly with both sides of the involute helical teeth of a gear such as shown in either Figures 2 and 3 or Figures 4 and 5. A tapered member having involute helical thread surfaces is shown in Figures 6 and 7 in the form of a tapered worm 50. As is known, the sides 51 and 52 of the threads of an involute helical taper worm can be imagined as generated, respectively, by straight lines which are maintained tangent to the cylinders 53 and 54, respectively, while being simultaneously rotated at a uniform rate about the axis 55 and moved at a uniform rate in the direction of that axis. The two cylinders 53 and 54 are of different diameters. The sides 53 and 54 of the worm thread are of constant pitch along the axis 55 but the pitch is different for the two sides.

In the axial plane, the sides of the involute tapered worm threads are of curved profile, but in a plane tangent to the base cylinder 53 from which the thread surface 51 is derived, the side 51 of the thread is of straight profile, as shown in Figure 7. In this same plane, the opposite side 52 of the worm thread will be of curved profile as shown exaggeratedly in this figure. In another plane tangent to the cylinder 54 from which the side 52 of the worm thread is derived, this side of the thread will be straight, as indicated in Figure 7, whereas the other side 51 of the thread will be of curved profile.

It will now be apparent that if an involute tapered worm is selected which has the opposite sides of its thread derived from base cylinders 53 and 54 which are of such different diameters that planes tangent thereto are spaced apart the same distance as are parallel planes tangent to the base cylinders 34 and 36 or 47 and 48 from which the involute helicoidal tooth surfaces of the gear teeth are derived, and if this worm is properly positioned in engagement with the gear, the opposite sides of the worm thread will mesh simultaneously and correctly with the opposite sides of the gear teeth. The discovery and determination of this relationship forms the basis upon which the hobbing, burnishing, lapping or shaving of gears according to the invention can be effected.

When the worm 50 is suitably gashed and relieved, it can be used for forming a tapered gear 60 having side tooth surfaces which are parts of involutte helicoidal surfaces. To cut this gear 60, the hob formed by gashing and relieving the worm 50 is fed into the gear blank to the proper depth while rotating the hob and gear blank continuously on their respective axes 55 and 61. No generating roll is required and the sides of the teeth of the gear 60 are finished in the end position of feed of the hob. The feed will preferably be in the direction of the axis 61 of the gear to be cut, but may be in any other suitable direction, providing that in the final position of feed, the hob will sweep out the whole of the finished tooth surfaces of the gear.

An especially fine finish may be obtained on the gear tooth surfaces if the hob is fed in addition in the direction 62 of its pitch surface at the zone of engagement of the hob and work. This movement along the line 62 may be effected after full-depth position has been reached or may be carried on simultaneously with the depthwise feed. It must be accompanied, however, as will readily be understood, by an additional turning motion of the hob or blank, in proportion to the movement.

This movement can be effected, therefore, by incorporating in the hobbing machine, means for moving the hob relative to the blank in the direction of the pitch surface of the hob at the zone of its engagement with the work and for timing this movement with the rotation of the hob.

The machine illustrated in the patent to Trbojevich No. 1,647,158 of November 1, 1927, might be used without alteration to hob gears according to this invention, but by slightly modifying the machine a motion could also be provided along the line 62 to improve the finish of the gears being cut.

Figures 8, 9, 10:
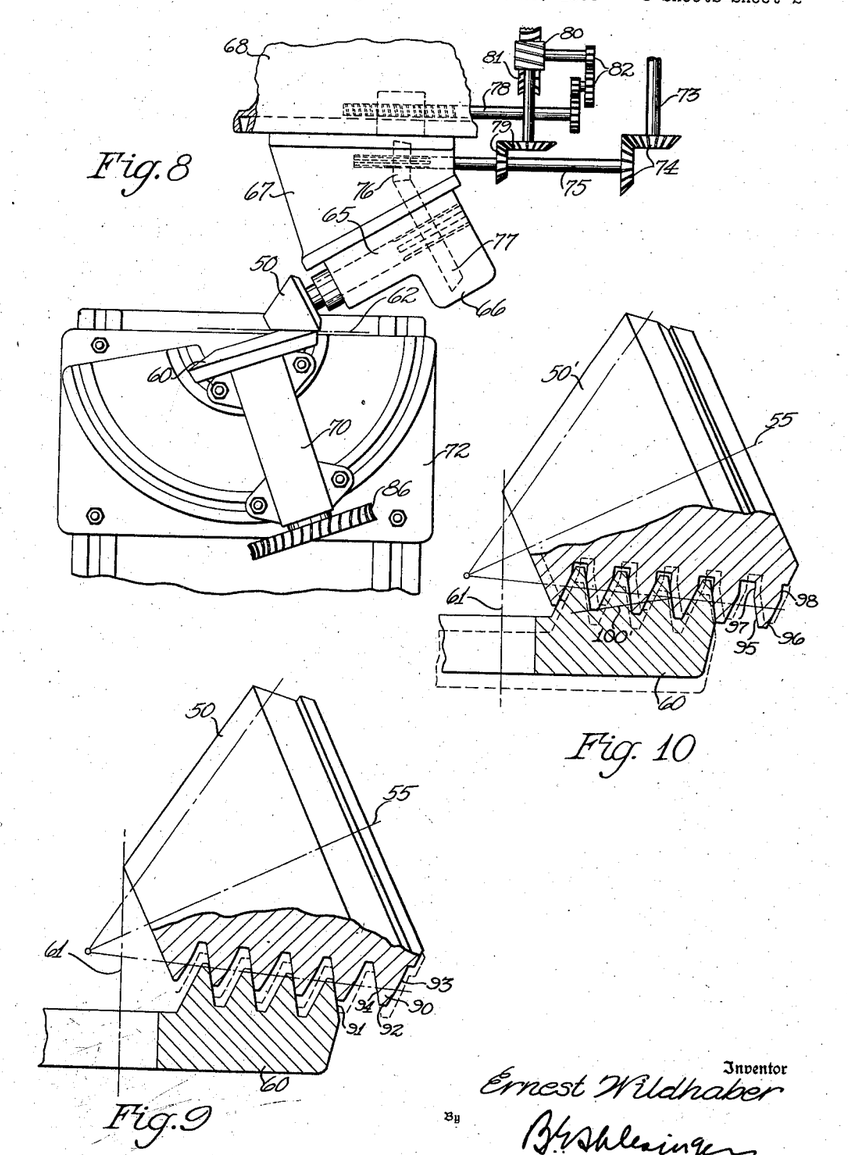
Figure 8 is a more or less diagrammatic view showing how in a machine constructed for practicing the present invention, a feed motion in the direction of the pitch surface of the hob at the zone of its engagement with the work may be used to produce a finer finish on the tooth surface of the gear.
Figure 9 is a view illustrating diagrammatically one preferred method of feeding the hob for roughing out the tooth spaces of the non-generated member of the pair.
Figure 10 is a view showing one embodiment of a tool for lapping gears according to the present invention, and illustrating the correcting motions which can be employed to maintain the accuracy of the lap.

In Figure 8 I have illustrated more or less diagrammatically one way in which such a machine may be modified to effect the motion along the line 62 in proper relation to the rotation of the hob. The hob 50 is secured to a spindle 65 that is journaled in a head 66 which is mounted on the slide 67 for adjustment in the direction of the hob axis. The slide 67 is, in turn, mounted on the face of the support 68 for movement in a direction parallel to the pitch surface of the hob at the zone of its engagement with the work, that is, for movement in the direction of the line 62. The gear 60 to be hobbed is secured to a spindle that is journaled in a head 70 which is angularly adjustable upon the support 72 for the purpose of properly positioning blanks of different cone angles into proper engaging relation with the hob.

The hob is driven from the shaft 73 through the bevel gearing 74, the shaft 75, the bevel gear 76 which has a splined connection with the shaft 75, and the bevel gear 77 which has a splined connection with the hob spindle 65. The shaft 73 may be driven from any suitable source of power. The screw 78 which actuates the slide 67 is driven in time with the hob rotation through the bevel gearing 79, the reduction gearing diagrammatically indicated by the worm 80 and wormwheel 81 and spur change gears 82. The work spindle will be driven in time with the hob through the wormwheel 86 and suitable gearing not shown. From the preceding description, it will be seen that as the hob 50 rotates on its axis it is slowly fed in the direction of the line 62. The depthwise feed motion required to cut teeth of proper depth on the blank may be imparted either to the support 68 or to the support 72.

In burnishing a gear according to this invention, an ungashed and unrelieved taper worm, such as shown at 50, is used as the burnishing tool and the burnishing operation is effected by correctly engaging the burnishing tool with the gear to be burnished and rotating the two together. Here, the tool and the blank do not have to be positively timed with one another, for the tool will drive the blank through their intermeshing engagement.

In shaving, a worm such as shown at 50 is employed which has its thread surfaces notched or gashed to provide cutting edges. These notches or gashes will be closely spaced together, as is the usual practice to provide the shaving action. For the shaving operation, the shaving tool is simply engaged with the blank and the two rotated together. Here again, there is no need for a positive geared connection between the tool and the work, because the tool can drive the work through their intermeshing engagement.

If it is desired in either burnishing or shaving to provide the additional motion along the line 62 and the tool and blank are not positively geared together, no provision need be made for an additional turning motion of the tool. The tool will automatically be turned in proper time with the blank rotation and the movement along the line 62 because of the inter-engagement of the thread of the tool and the teeth of the gear.

Burnishing and shaving operations with the present invention have a true correcting action, more so than in any other known shaving or burnishing process, on account of the very long arc of contact between the gear and the taper tool.

With the disclosed form of gear tooth, the tool 50 will continue to mesh correctly with the gear 60 regardless of the position of the tool along the line 62, providing only that the tool position is within such limits that the tool thread may clear the concave sides of the gear teeth. Within such limits, precisely the same tooth surfaces are produced on the gear at any position of the tool along the line 62. The surfaces of action between the tool and gear are planes 85 and 86 (Figure 6) which are tangent to the base cylinders 87 and 88, respectively, of the gear and to base cylinders 53 and 54, respectively, of the tool and which are parallel to the projected tool axis 55.

In order to rough out the teeth of a gear blank at a somewhat higher speed than the finishing operation above described, a modified form of feed may be employed in the roughing operation. Thus, instead of feeding the hob relative to the blank along the gear axis with the hob and blank timed together in the exact ratio of their numbers of teeth and thread, which means that the hob teeth will cut on both sides as is the usual practice in hobbing, the hob may be fed into the blank along the gear axis but with a slightly modified ratio between the hob and blank, so that the hob teeth continuously contact with the tooth surfaces to be cut on one side of the teeth only. In this case, the teeth of the hob will cut only on the top and on the side opposite to that along which the feed takes place. Very keen cutting edges may be provided on the top and on said cutting side so that a very rapid roughing operation is possible. It is not practical, however, to make the hob so that there will be keen cutting edges on both sides of its teeth.

Figure 9 illustrates the modified roughing operation. The hob is again designated at 50 and the gear being roughed at 60. The feed of the hob relative to the blank is along the axis 61 of the work, but the hob and blank are rotated together in such timed relation that the hob thread 90 continuously contacts with one side 91 of the gear teeth. The result is that the hob teeth cut only with their top cutting edges 92 and their side cutting edges 93. The side 94 of the hob teeth does no cutting. Successive positions of the hob during the feed are illustrated in full and dotted lines.

If during the depth feed, the hob is moved to follow the convex side of the gear teeth, then the convex side of the hob thread is made particularly keen for the purpose of this modified roughing operation. The hob is preferably provided with plane flutes which are parallel to the hob axis and which are also so formed as to provide a front rake on the hob teeth. The hand of the flutes is preferably such that the end of the hob tooth which is disposed nearer the large end of the hob contains the cutting face. The hand of the flute is opposite when the hob is intended to follow the concave side of the gear teeth in the roughing feed.

Gears having the tooth shape disclosed may readily be lapped according to the present invention by using a lap similar to the tool 50. Pitch errors are readily corrected and the tooth shapes are rapidly made uniform on account of the large number of teeth of the gear which are simultaneously in contact with the threads of the tool.

With this process, it is very easy to provide correcting motions which will keep the lap automatically in correct shape without a separate truing operation proper. The corrective motion may take the form of a slow reciprocatory motion along the line 62. This will correct the longitudinal shape of the thread of the lap. Another corrective motion may be provided, for instance, along the gear axis 61. If this latter motion is provided, the lower flank portions of the lap thread or threads are preferably removed, as shown in Figure 10. Here the sides 95 and 96 of the thread of the lapping tool 50' are cut away on their lower flank portions, as indicated at 97 and 98. With such a lap and with the feed in the direction of the axis 61 of the gear, the portions of the thread profile which are left unmodified, engage a large portion of the gear tooth profile in successive steps of feed into depth.

In still another modification, the correcting action may be obtained by combining the two motions described and producing them through motions along the axis of both the gear and lap. This is illustrated in Figure 10 where two successive positions of the lap in its feed along its axis 55 and of the gear 60 in its feed along its axis 61 are illustrated in full and dotted lines. It is essential that these two motions have different periods of which neither is a direct multiple of the other. The two independent motions, which render the gears insensitive to much larger displacements in use than the usual lapping motions, are supplemented by the large arc of contact of the lap and of the work and provide, therefore, a complete self-correction of the lap and, of course, of the work.

Figures 11, 12, 13, 14:
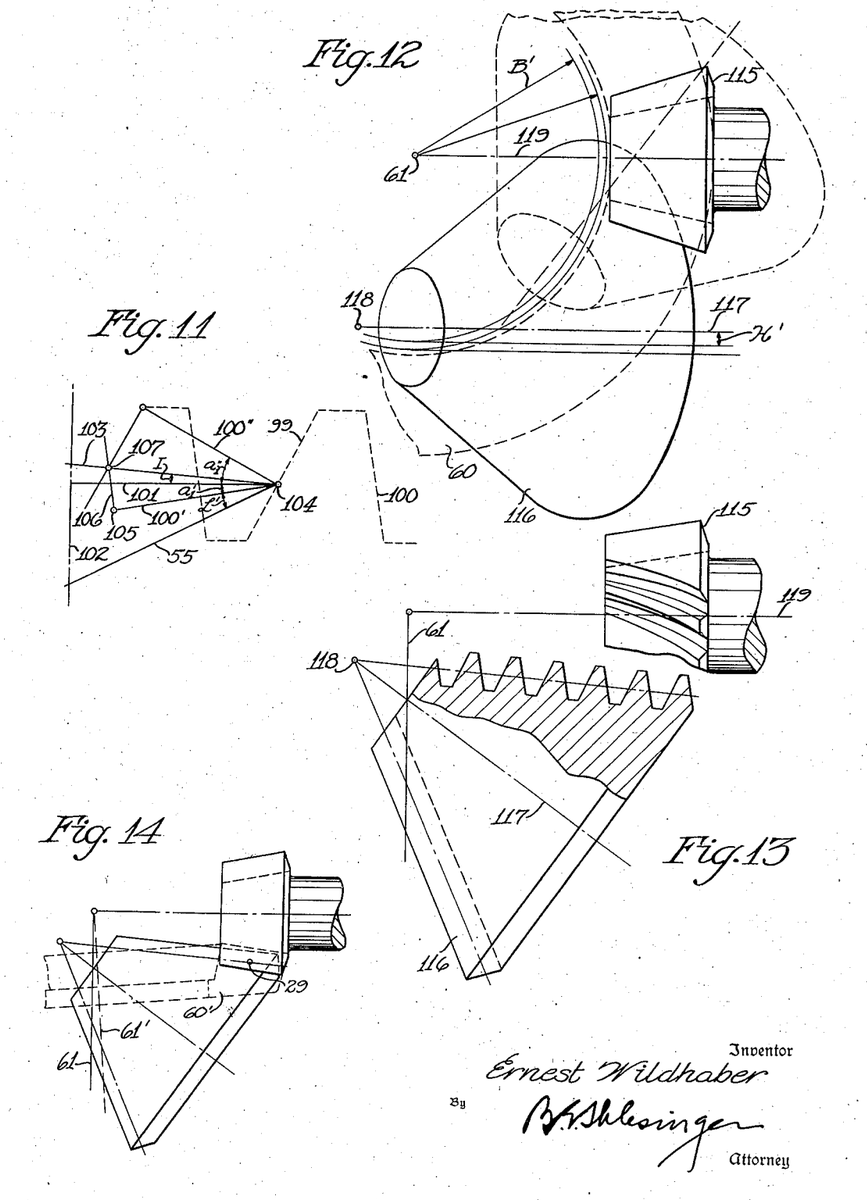
Figure 11 is a diagrammatic view illustrating certain relationships on which the setting of the hob is based in cutting gears according to the present invention.
Figures 12 and 13 are a plan view and a side elevation, respectively, illustrating diagrammatically the method of hobbing the generated member of the pair according to the present invention.
Figure 14 is a view illustrating diagrammatically how the generating roll may be modified to produce tooth surfaces on the generated member of the pair which will have a suitable mismatch with reference to the tooth surfaces of its mate gear.

The hobbing, burnishing, shaving and lapping operations on the gear all rest upon the same theory and the formulas for determining the relations of tool and work and the manner of positioning the same are identical for all of these operations. These formulas will now be given and reference will be had particularly to Figure 11 for their derivation. In these formulas, the convex side 100 of the gear teeth is denoted by prime and the concave side 99 by second. In Figure 11, the tooth normals 100' and 100'' are shown in relation to a plane 101 perpendicular to the gear axis 102. They are inclined to that plane at angles $a_1'$ and $a_1''$.

We shall now determine the direction 103 where the linear pitch of the two sides of the gear teeth is the same. The linear pitch is equal to the normal pitch $P_1$ divided by the cosine of the angle included between the direction 103 and the respective tooth normals.

In Figure 11, the distance 104—105 equals the normal pitch $P_1'$. Line 106 drawn through point 105 perpendicular to the tooth normal 100' intersects line 103 at a point 107 which marks the end point of the linear pitch 104—107.

$$(104-107) = \frac{P_1'}{\cos(a_1'+I)}$$

where $(a_1'+I)$ is the angle included between 100' and 103 and capital I is the angle that the line 103 makes with respect to the plane 101.

A similar equation is obtained for the other side of the gear teeth.

$$(104-107) = \frac{P_1''}{\cos(a_1''+I)}$$

where $(a_1'')$ is given a negative value, representing the concave side of the gear teeth.

Hence:

$$\frac{P_1'}{\cos(a_1'+I)} = \frac{P_1''}{\cos(a_1''+I)}$$

and $$\frac{P_1'}{P_1''} = \frac{\cos(a_1'+I)}{\cos(a_1''+I)} = \frac{\cos a_1' \cos I - \sin a_1' \sin I}{\cos a_1'' \cos I - \sin a_1'' \sin I} = \frac{\cos a_1'}{\cos a_1''} \cdot \frac{1-\tan I \tan a_1'}{1-\tan I \tan a_1''}$$

and $$(1-\tan I.\tan a_1'') \cdot \frac{P_1'}{P_1''} \frac{\cos a_1''}{\cos a_1'} = 1 - \tan I. \tan a_1'$$

and $$\tan I \left(\tan a_1' - \tan a_1'' \cdot \frac{P_1' \cos a_1''}{P_1'' \cos a_1'}\right) = 1 - \frac{P_1' \cos a_1''}{P_1'' \cos a_1'}$$

(VI), where $a_1''$ is negative.

Tan I and I may readily be determined from this equation. When $P_1'$ is equal to $P_1''$ as in the first described embodiment of my invention, Equation (VI) may be transformed into $$I = \frac{-a_1' + a_1''}{2} \quad \text{(VIa)}$$

This equation may also readily be derived from Figure 11. Preferably the included angle $$(a_1' - a_1'')$$

of the normals 100' and 100'' is made an integral number of degrees.

We shall now determine the exact shape of the forming member or tool and the position which it must occupy relative to the blank or gear. Plane 85 (Figure 6) is offset from the tool axis 55 a distance H, which is equal to the radius of the base cylinder of the concave side of the tool thread. The circumference $2\pi H$ of the base cylinder multiplied by the sine of the angle L' between the tool axis 55 and the direction of the normal 100' (Fig. 11) is equal to the base-pitch $P_1'$ multiplied by the number N' of threads or starts in the tool.

The angle $L' = G' - I - a_1'$ and the angle $G'$ is the angle between the direction 62 and the tool axis 55 and may be called the pitch angle of the tapered tool.

From the above, it will be seen that:

$$2\pi H \cdot \sin L' = P_1' N'$$

A similar interrelation holds true on the convex side 52 of the tool thread which engages the concave side 99 of the gear teeth. The radius of the base cylinder for this side of the thread is equal to the distance of the plane 86 from the tool axis 55, that is, equal to the distance H—the distance D between the planes 85 and 86. Hence:

$$2\pi(H-D) \cdot \sin L'' = P_1'' n$$

where $L''$ is the angle for the convex side of the tool thread corresponding to the angle $L'$ of the concave side of the thread.

Now from the second last formula, $$H = \frac{P_1'}{2\pi} \cdot \frac{N'}{\sin L'}$$

Then:

$$(H-D) = \frac{P_1'}{2\pi} \cdot \frac{N'}{\sin L'} - D = \frac{P_1'' N'}{2\pi \sin L''} \quad \text{(VII)}$$

Hence:

$$N'\left(\frac{P_1'}{2\pi \cdot \sin L'} - \frac{P_1''}{2\pi \cdot \sin L''}\right) = D$$

or $$N'\left(\frac{P_1'}{2\pi \sin(G'-I-a_1')} - \frac{P_1''}{2\pi \sin(G'-I-a_1'')}\right) = D \quad \text{(VIII)}$$

This formula furnishes the interrelation between the number $N'$ of threads of the tool and the pitch cone angle $G'$ of the tool. One may assume $N'$, which is usually taken as one thread, and then determine $G'$ from the formula with a known process of interpolation. Thereafter, H may be determined from Formula VII of the base cylinder of the longitudinally concave side of the tool thread, that is, the side of the thread which faces the tool apex. The radius of the base cylinder of the opposite side is (H—D). This gives us the complete data for the tool. The base pitch of the involute helicoidal tool thread is $P_1'$ and $P_1''$ on its two sides, respectively. The inclination of the thread normals with respect to the direction of the tool axis is $L'$ and $L''$, respectively.

The two sides of the unrelieved tool threads may be produced accurately with straight cutting edges positioned in the planes 85 and 86, respectively, when these cutting edges are moved in the direction 62 at the rate of $$N' \cdot \frac{P_1'}{\cos(a_1'+I)} = N' \cdot \frac{P_1''}{\cos(a_1''+I)}$$

per revolution of the tool blank. The tool may also be formed with a milling cutter or a grinding wheel having a straight profile.

In hobbing, shaving, burnishing or lapping gears according to this invention, the tool axis 55 is inclined to the direction of the gear axis 20 or 61 at an angle of $90°+(G'-I)$ and offset a distance $(B'+H)$ therefrom. The exact position of the tool apex 110 is immaterial. It is preferably kept a little beyond a line perpendicular to the gear and tool axes, as shown in Figure 6.

There are many ways of producing a pinion to run with a gear formed according to the above described method of the present invention. I shall first describe the preferred method of hobbing the pinion. This method, as will be seen, is based upon the use of the simplest form of taper hob, namely, the taper hob having involute helicoidal thread surfaces.

I have described above the method of determining a tool which will be fully conjugate to a given gear and which will mesh externally with said gear. Through an analogous method, a tapered tool having involute helical thread surfaces may be determined which will mesh internally with the same tooth sides of the gear. Through this method we arrive at the same Formulas VII and VIII as before, $G'$ being introduced as a negative quantity. Here, $a_1'$ and $P_1'$ which refer to the convex side of the gear teeth will refer to the convex side of the thread of the pinion-forming tool since this meshes internally with the gear. $a_1''$ and $P_1''$ refer to the concave side.

In the special case when $P_1' = P_1'' = P_1$ and according to Formula VIa:

$$I = -\frac{a_1' + a_1''}{2}; \text{ and } I + a_1' = -(I+a_1'') = b$$

then Formula VIII may be transformed into $$N' \cdot \frac{P_1}{2}\left(\frac{1}{\sin(G'-b)} - \frac{1}{\sin(G'+b)}\right) = B$$

This formula gives equal numbers $N'$ of threads on the gear and the pinion tools for equal positive and negative angles $G'$. If $(-G')$ is introduced in place of $(G')$, the members inside the parenthesis read:

$$\frac{1}{\sin(-G'-b)} - \frac{1}{\sin(-G'+b)} =$$
$$-\frac{1}{\sin(G'+b)} + \frac{1}{\sin(G'-b)}$$

In other words, the gear hob and the pinion hob or broadly the gear tool and the pinion tool, have equal pitch angles $G'$.

It will be seen hereafter that the hand of the gear tool and of the correct pinion tool is the same, and that for this reason the pinion tool will be identical with the gear tool in the above mentioned special case, where $P_1' = P_1''$. In other words, the same hob or tool may be used for producing both the gear and the pinion. Ordinarily, however, namely, when $P_1'$ is not equal to $P_1''$, two different tools of the same hand will be used.

Figures 12 and 13 illustrate the method of producing the pinion 115 so that it will be conjugate to the gear 60. The pinion cutting tool is designated as 116. Its axis is indicated at 117 and its apex at 118. It has a pitch angle $G'' = (-G')$, which is introduced as a positive quantity in the formulas given below.

The tool is so positioned relative to the pinion blank 115 that its axis 117 is inclined at an angle of $$90° + (G'-I) = 90° - G'' - I$$

to the direction of the axis 61 of the gear 60 to which the pinion is to be generated conjugate. The tool axis 116 is also offset from the gear axis 61 a distance $(B'+H')$. Here $H'$ is the base radius of the convex side of the pinion tool as determined from Formula VII:

$$H' = \frac{P_1'}{2\pi} \cdot \frac{N'}{\sin L'} = -\frac{P_1'}{2\pi} \cdot \frac{N'}{\sin(G'-I-a_1')} +$$
$$\frac{P_1'}{2\pi} \cdot \frac{N'}{\sin(-G''-I-a_1')} = -\frac{P_1'}{2\pi} \cdot \frac{N'}{\sin(G''+I+a_1')}$$

$H'$ is seen to be negative, so that the offset $(B'+H')$ of the pinion tool is smaller than $B'$.

It is readily understood that the above determined position of the pinion tool 116, which may mesh internally with the imagined tooth surfaces of the gear 60, calls for a tool of the same hand as the gear tool 60.

As with the gear, so it is in the case of the pinion that the position of the tool apex 118 is immaterial.

If the tool is embodied as a hob for the purpose of cutting the tooth surfaces of the pinion, then it will be positively geared to the pinion to rotate in timed relation therewith, as is the usual hobbing practice. The tool 116 represents the tooth surfaces of the gear 60 during the pinion generation and to produce the pinion, the tool 116 and the pinion blank 115 are rotated in timed relation on their respective axes 117 and 119 and simultaneously a relative rolling movement is produced between the tool 116 and pinion blank 115 about the axis 61 of the mating gear 60 in the same manner as though the pinion 115 were rolling with its mate. The tooth surfaces of the pinion are thereby completely and correctly generated conjugate to those of the gear.

In Figure 12, the tool 116 is shown in full lines at one end of the generating roll and in dotted lines near the other end of the generating roll.

If a pair of spiral bevel gears are being produced, the axis 119 of the pinion will intersect the axis 61 of the gear during the generating roll, whereas if a pair of hypoid gears are being produced, the axis of the pinion blank will be offset from the axis 61 of the gear in accordance with the amount of offset between the gear and pinion axes when the pair are in mesh.

The tool 116 may also be embodied as the shaving tool, that is, as a cutting tool having an increased number of cutting edges. In this case, the method of producing the pinion will be exactly the same as that described, except that the positive timed connection between the tool and the pinion blank may be dispensed with if so desired.

To lap the pinion, it is preferably run with its mate gear but if so desired it may be run with a taper worm corresponding to the tool 116. The pinion may also be lapped efficiently by running it with a cast-iron lap corresponding to the mate gear.

In either case, lapping operations on gear and pinion can be effected both simply and efficiently. If cast-iron or similar laps are used on the pinion, truing operations may readily be provided so that the lap does not wear out of shape. Thus, the lap may be reciprocated in the direction of its axis, without altering the tooth shapes of the pinion or of the lap.

The tapered tools used in producing gears according to the present invention can be employed to cut, shave or burnish all gears which have the same normal pitch.

Where mismatch of the tooth surfaces of the gear and pinion is desired, standard tools may be used and any desired amount of mismatch obtained by rolling the pinion relative to the tool as though it were rolling with some gear 60' other than its mate whose axis 61', as indicated in Figure 14, is inclined to the axis 61 of the mate gear. This axis 61' should lie in a plane containing the gear axis 61 and passing through the mean point of contact 29 of the gear and pinion.

While the invention has been described in connection with certain specific embodiments thereof, it will be understood that the invention is capable of still further modification and the present application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of producing a tapered gear which comprises rotating a tool, whose operating portions are arranged in a thread, in engagement with the work while producing a bodily relative displacement of the tool relative to the work in the direction of the pitch surface of the tool at the zone of its engagement with the work.

2. The method of producing a tapered gear which comprises rotating a tool, whose operating portions are arranged in a tapered thread surface, in engagement with the work while producing a bodily relative displacement of the tool relative to the work in the direction of the pitch surface of the tool at the zone of its engagement with the work.

3. The method of producing a tapered gear which comprises rotating a tapered hob, whose cutting teeth are arranged in an involute helicoidal thread which is of such thickness as to have contact simultaneously with opposite sides of finished tooth spaces of the gear to be cut, in timed relation with a continuously rotating tapered gear blank and feeding said hob relative to the blank in the direction of depth of the gear teeth while maintaining a fixed angular relation between the hob and blank axes so that in final cutting position, the hob sweeps out the finished tooth surfaces of the gear.

4. The method of producing a tapered gear which comprises rotating a tapered hob, whose cutting teeth are arranged in an involute helicoidal thread, in engagement with a continuously rotating tapered gear blank and feeding said hob relative to the blank into full depth position while maintaining a fixed angular relation between the hob and blank axes and, when full depth position is reached, moving the hob relative to the blank in the direction of the pitch surface of the hob at the zone of its engagement with the blank.

5. The method of producing a tapered gear which comprises rotating a tapered hob, whose cutting teeth are arranged in an involute helicoidal thread, in engagement with a continuously rotating tapered gear blank and feeding said hob relative to the blank into full depth position while maintaining a fixed angular relation between the hob and blank axes and while moving the hob relative to the blank in the direction of the pitch surface of the hob at the zone of its engagement with the blank.

6. The method of cutting the tooth surfaces of a tapered gear which comprises feeding a hob relative to a tapered gear blank in the direction of depth of the gear teeth while rotating the hob and blank continuously on their respective axes in timed relation at a rate different from the ratio of the number of threads of the hob to the number of teeth of the gear to be produced.

7. The method of producing a pair of tapered gears which comprises cutting one member of the pair by rotating a tapered hob, whose cutting edges are arranged in an involute helicoidal thread which is of such thickness as to have contact simultaneously with opposite sides of finished tooth spaces of the gear to be cut, in engagement with a continuously rotating tapered gear blank while imparting a relative movement between the hob and blank in the direction of the depth of the teeth of the blank and while maintaining a constant angular relation between the hob and blank axes, and cutting the other member of the pair by rotating an involute helicoidal hob of the same hand as the first hob in timed relation with a continuously rotating gear blank while producing a relative rolling movement between the second hob and blank as though the second blank were meshing with its mate gear.

8. The method of producing a tapered gear, whose opposite side tooth surfaces lie in involute helicoidal surfaces having, respectively, different base-cylinders, which comprises positioning a hob, whose opposite side cutting edges are arranged in involute helicoidal surfaces having, respectively, different base-cylinders, in such offset relation to a tapered gear blank that planes tangent to the two base-cylinders of the hob are tangent, respectively, also to the two base-cylinders of the gear, and rotating said hob in engagement with the blank while rotating the blank continuously on its axis and simultaneously producing a relative feed between the hob and blank while maintaining a fixed angular relation between the hob and blank axes.

9. The method of finishing the tooth surfaces of a tapered gear which comprises rotating a tool, whose operating surfaces are arranged in a tapered thread, in engagement with the gear while reciprocating tool and gear on their respective axes.

10. The method of finishing a tapered gear whose tooth surfaces lie in involute helicoidal surfaces, which comprises bringing an involute helicoidal tapered worm, which has the lower flank portions of its thread surfaces removed, into engagement with the gear and rotating the worm and gear together while producing relative reciprocating movements between the worm and gear in the direction of the axis of the gear.

11. The method of finishing a longitudinally curved tooth tapered gear which comprises rotating a taper worm in engagement with the gear while producing a bodily relative movement of the worm relative to the gear in the direction of the pitch surface of the worm at the zone of its contact with the gear.

12. The method of producing a gear which comprises feeding a tool having its operating portions arranged in a taper thread surface into full depth engagement with the work and, while rotating the tool and work together, producing bodily reciprocatory movements of the tool relative to the work in the direction of the pitch surface of the tool at the zone of its engagement with the work.

13. The method of producing a tapered gear which comprises rotating a tool having its operating portions arranged in a tapered involute helicoidal thread which is of such thickness as to have contact simultaneously with opposite sides of the finished tooth spaces of the work in engagement with the work while maintaining the angular relation between the axes of the tool and work-piece constant so that the operating portions of the tool in final position sweep out the whole finished tooth surfaces of the work.

14. The method of producing a tapered gear which comprises rotating a hob, whose cutting edges are arranged in a tapered thread, in engagement with the work while producing a relative movement between the hob and work in the direction of the pitch surface of the hob at the zone of its engagement with the work and effecting an additional algebraic rotational movement to maintain the correct timed relation between the rotation of the hob and blank during said relative movement.

15. The method of producing a tapered gear which comprises feeding a hob in a direction parallel to the blank axis while rotating the hob and blank together at a ratio different from the ratio of the number of threads in the hob to the number of teeth in the gear to be produced.

16. The method of producing a tapered gear which comprises feeding a tapered hob of involute helicoidal form in a direction parallel to the blank axis while rotating the hob and blank together at a ratio different from the ratio of the number of threads in the hob to the number of teeth in the gear to be produced.

17. The method of producing a tapered gear which comprises rotating a tool having its operating portions arranged in a taper thread surface in engagement with the work while effecting reciprocating motion along the axes of both tool and work, the periods of which are different and are not direct multiples, one of the other.

18. The method of producing a tapered gear which comprises rotating a tool having its operating portions arranged in a tapered thread of involute helicoidal form in engagement with the work while effecting relative motion between the tool and work in the direction of the axis of the tool and in the direction of the axis of the work.

19. The method of producing a tapered gear which comprises rotating a tool having its operating portions arranged in a tapered thread of involute helicoidal form in engagement with the work while producing relative motions between the tool and work in the direction of the axis of the tool and in the direction of the axis of the work, the two last named motions having different periods of which neither is a multiple of the other.

20. The method of producing a pair of gears which comprises producing one member of the pair by feeding a tool having its operating portions arranged in a taper thread surface into full depth engagement with the work while rotating the tool and work together in such way that in full depth position, the tool sweeps out the whole of the finished tooth surfaces of the work, and producing the other member of the pair by rotating a tool having its operating portions arranged in a taper thread surface in engagement with the work and simultaneously producing a relative movement between the tool and the work about an axis inclined to the axis of the work at a different angle from the angle between the axes of the two gears when in mesh.

21. The method of producing a pair of tapered gears which comprises producing one member of the pair by rotating a tool having its operating portions arranged in a tapered involute helicoidal thread which is of such thickness as to have contact simultaneously with opposite sides of the finished tooth spaces of the work in engagement with a rotating work-piece in such way that the operating surfaces of the tool in final position sweep out the whole finished tooth surfaces of the work and producing the other member of the pair by rotating a tool having its operating surfaces arranged in a tapered involute helicoidal thread which is of such thickness as to have contact simultaneously with opposite sides of the finished tooth surfaces of the work in engagement with a second work-piece while rotating the second work-piece on its axis and simultaneously producing a relative movement between the second tool and second work-piece about an axis representing the axis of the mate gear.

22. The method of producing a pair of tapered gears which comprises producing one member of the pair by rotating a tool having its operating portions arranged in a tapered thread of involute helicoidal form in engagement with a rotating work piece in such way that the operating surfaces of the tool in final position sweep out the whole finished tooth surfaces of the work, and producing the other member of the pair by rotating a tool having its operating surfaces arranged in a tapered thread of involute helicoidal form in engagement with a second work-piece while rotating the second work-piece on its axis and simultaneously producing a relative movement between the second tool and second work-piece about an axis inclined to the axis of the second work-piece at an angle different from the angle between the axes of the two gears when in mesh.

23. The method of finishing a gear whose tooth surfaces lie in involute helicoidal surfaces, which comprises bringing a tool, whose operating portions lie in a tapered thread surface of involute helicoidal form, into engagement with the gear and rotating the tool and the gear together while producing a relative bodily movement between the tool and the gear in the direction of the pitch surface of the gear at the zone of its contact with the gear and simultaneously effecting relative reciprocatory movement between the tool and the gear in the direction of the axis of the gear.

24. The method of producing a tapered gear which comprises bringing a tool, whose operating portions are arranged in a tapered thread surface of involute helicoidal form, into engagement with the gear and rotating the tool and gear together while producing bodily relative movements between the tool and gear in the direction of the pitch surface of the tool at the zone of its engagement with the gear.

25. The method of producing a pair of tapered gears which comprises cutting one member of the pair without generating roll by imparting a cutting motion to a tool while effecting a relative depthwise feed movement between the tool and blank so that in full depth position, the tool will finish-cut the whole finished tooth surface of the blank, and generating the other member of the pair by imparting a cutting motion to a tool while producing a relative rolling movement between the tool and blank as though the gear being cut were rolling on a conical gear other than its mate whose axis is inclined to the axis of the blank at an angle different from the angle between the axis of the gear being cut and its mate when the pair are in mesh.

26. The method of producing one member of a pair of tapered gears of which the other member is produced without generating roll, which comprises imparting a cutting motion to a tool in engagement with the gear blank while producing a relative rolling movement between the tool and the blank as though the blank were rolling on a conical gear other than its mate whose axis is inclined to the axis of the blank at an angle smaller than the angle between the axis of the gear being cut and the axis of its mate gear when the pair are in mesh.

ERNEST WILDHABER.